Feb. 13, 1934.   E. E. TOUGAS ET AL   1,946,888
MACHINE FOR DRESSING EMERY HOBS
Filed July 7, 1930   14 Sheets-Sheet 1

Inventors:
Emile E. Tougas,
Martin T. Schumb,

Inventors:
Emile E. Tougas,
Martin T. Schumb,
by Walter E. Lombard,
Atty.

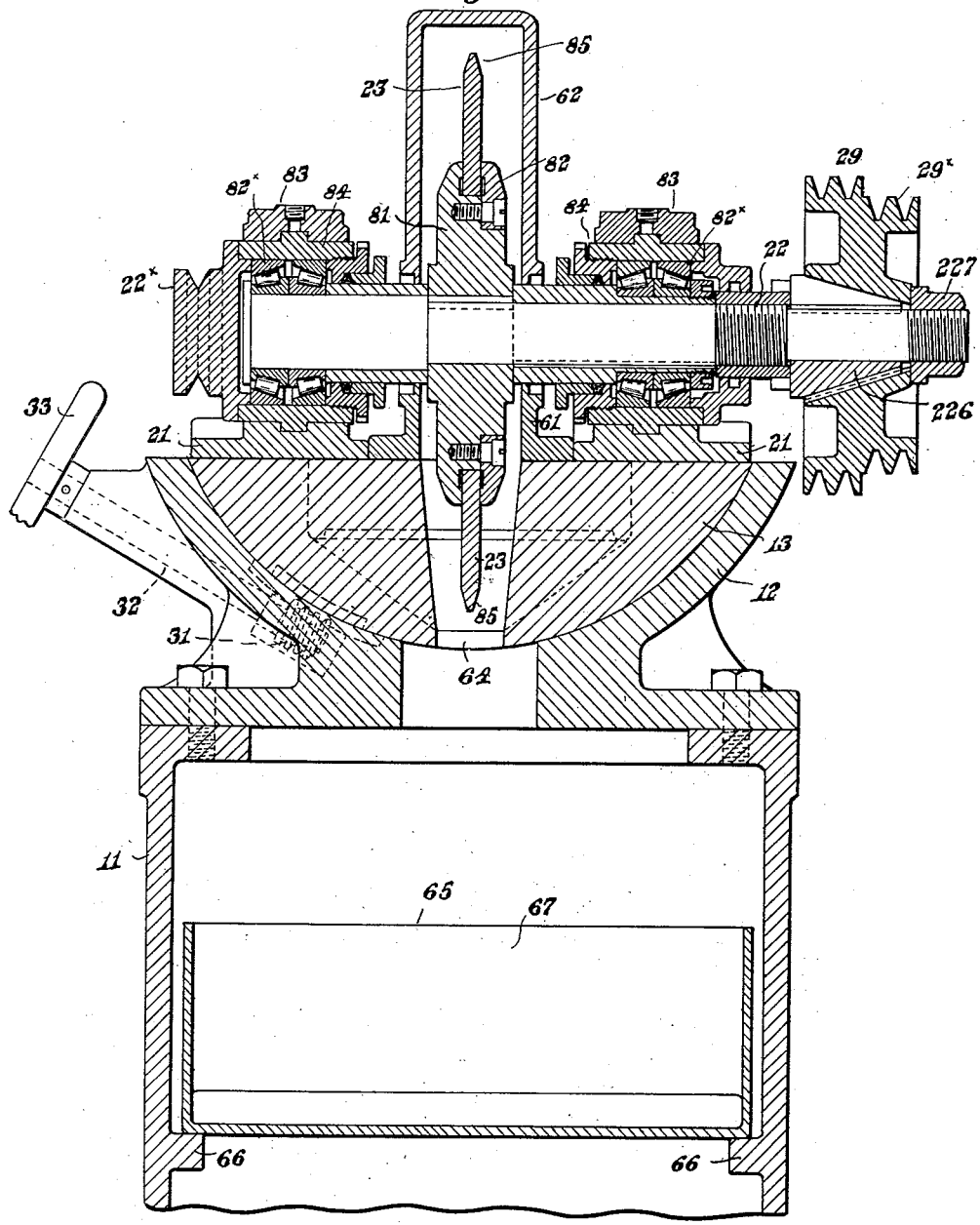

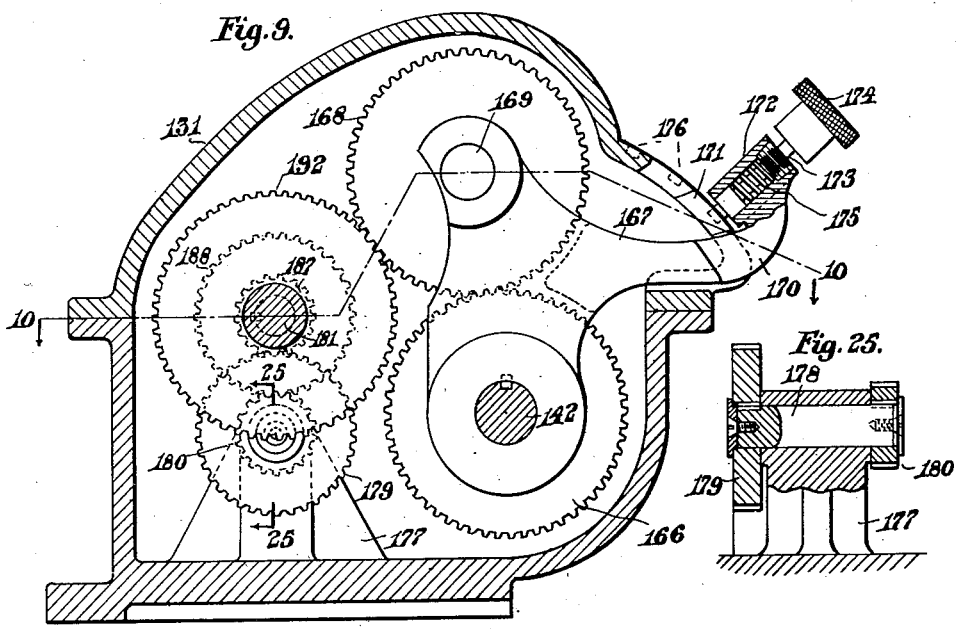
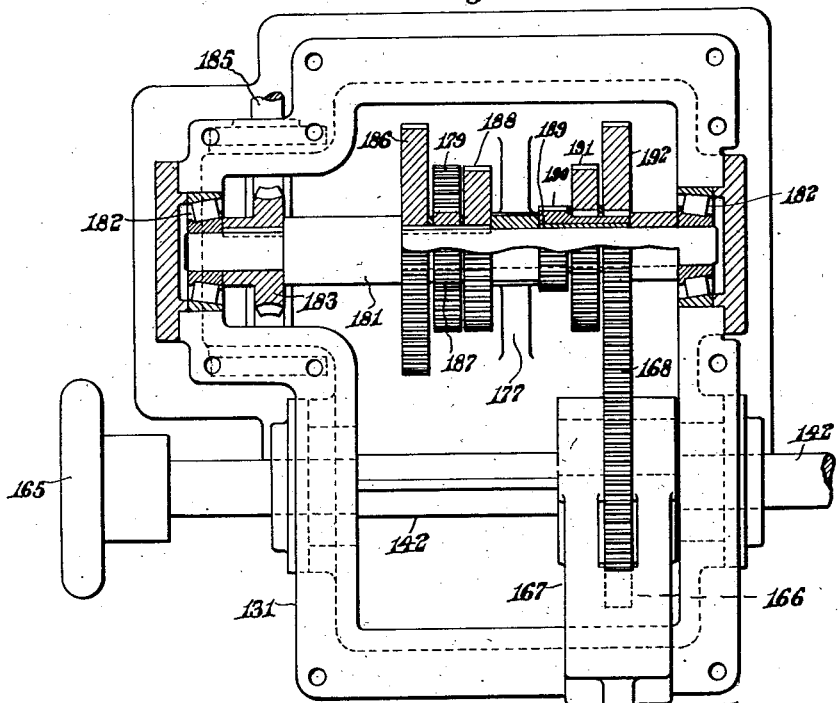

Feb. 13, 1934.  E. E. TOUGAS ET AL  1,946,888
MACHINE FOR DRESSING EMERY HOBS
Filed July 7, 1930  14 Sheets-Sheet 10

Inventors:
Emile E. Tougas,
Martin T. Schumb,
by Walter E. Lombard, Atty.

Feb. 13, 1934.   E. E. TOUGAS ET AL   1,946,888
MACHINE FOR DRESSING EMERY HOBS
Filed July 7, 1930   14 Sheets-Sheet 11
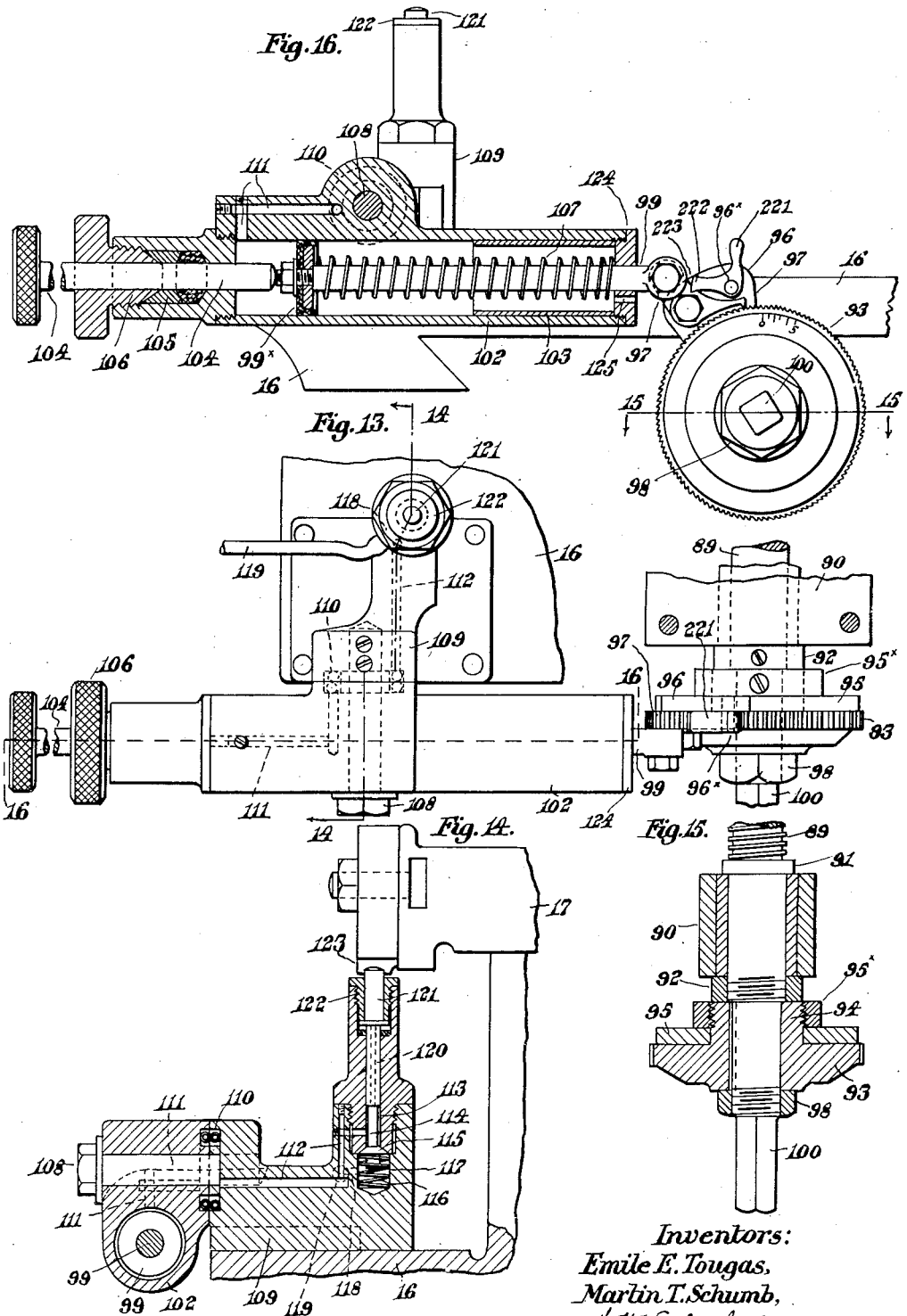
Inventors:
Emile E. Tougas,
Martin T. Schumb,
by Walter E. Lombard, Atty.

Feb. 13, 1934.   E. E. TOUGAS ET AL   1,946,888
MACHINE FOR DRESSING EMERY HOBS
Filed July 7, 1930   14 Sheets—Sheet 12
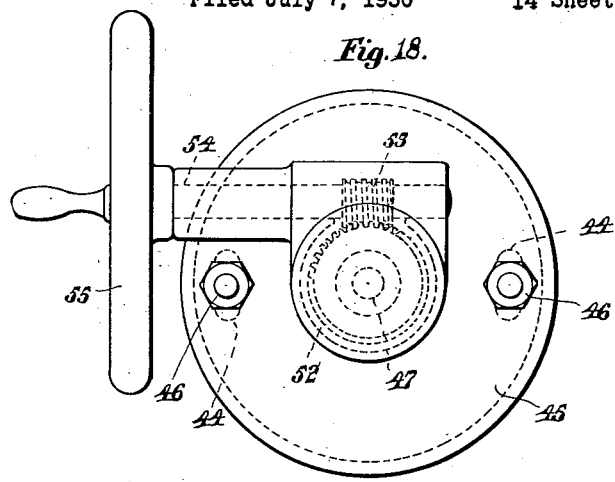
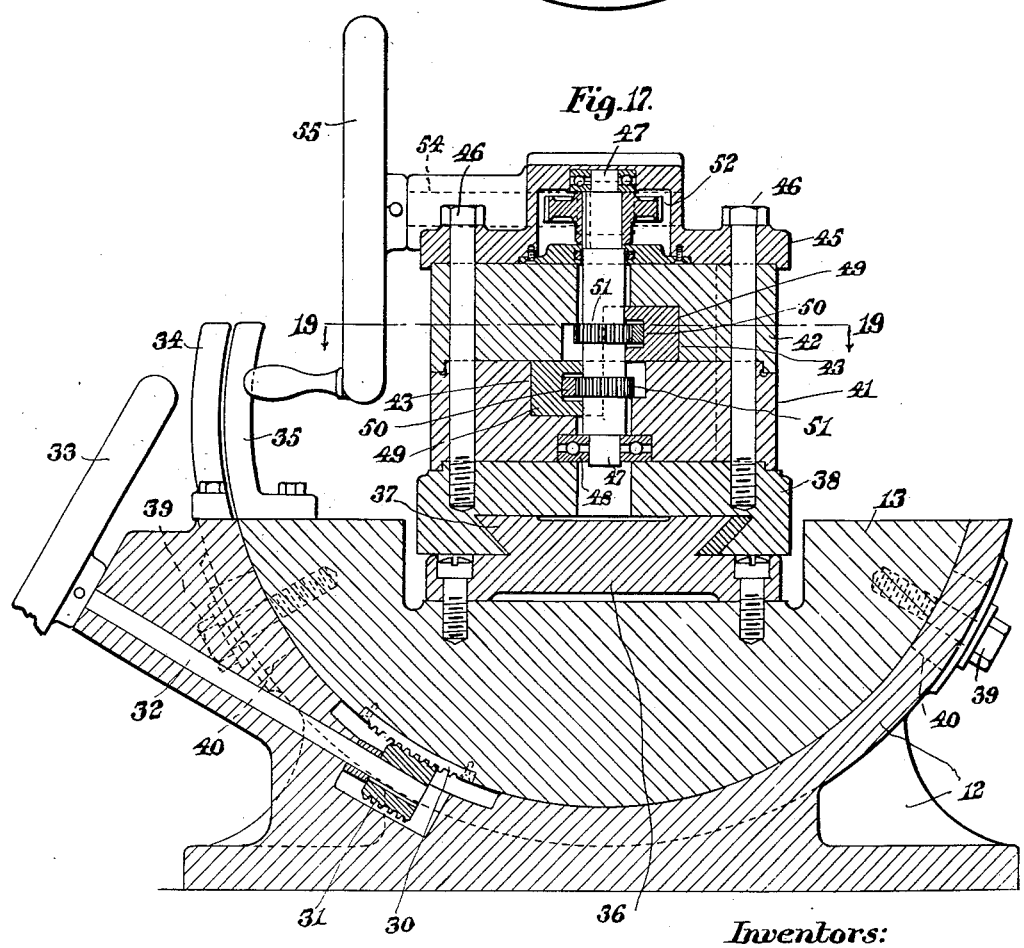
Inventors:
Emile E. Tougas,
Martin T. Schumb,
by Walter E. Lombard, Atty.

Feb. 13, 1934.  E. E. TOUGAS ET AL  1,946,888
MACHINE FOR DRESSING EMERY HOBS
Filed July 7, 1930  14 Sheets-Sheet 13
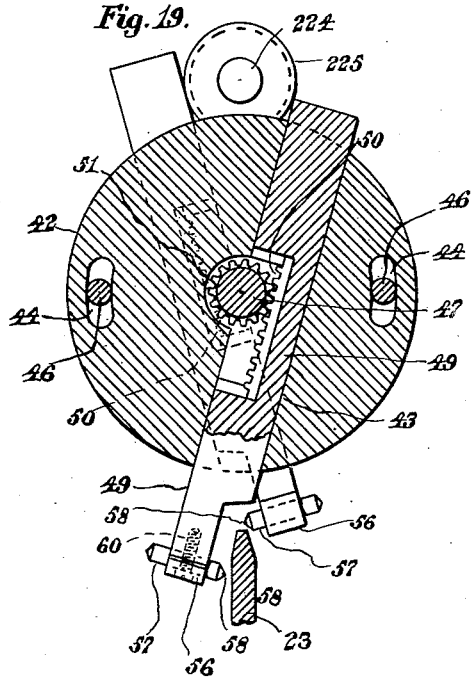
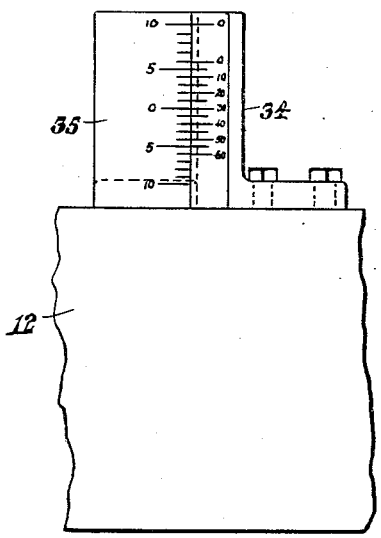
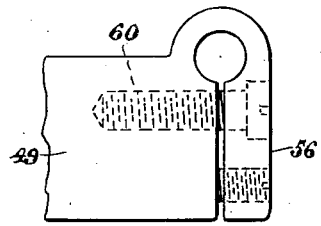
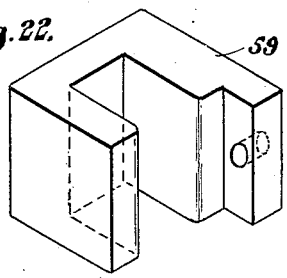
Inventors:
Emile E. Tougas,
Martin T. Schumb,
by Walter E. Lombard, Atty.

Feb. 13, 1934.  E. E. TOUGAS ET AL  1,946,888
MACHINE FOR DRESSING EMERY HOBS
Filed July 7, 1930   14 Sheets-Sheet 14

Inventors:
Emile E. Tougas,
Martin T. Schumb,
by Walter E. Lombard.
Atty.

Patented Feb. 13, 1934

1,946,888

UNITED STATES PATENT OFFICE 1,946,888

MACHINE FOR DRESSING EMERY HOBS

Emile E. Tougas, Wollaston, and Martin T. Schumb, Milton, Mass., assignors to Boston Gear Works, Inc., Quincy, Mass., a corporation of Massachusetts Application July 7, 1930. Serial No. 466,026

20 Claims. (Cl. 125—11)

The present invention relates to machines for dressing emery hobs, which hobs are subsequently used in grinding hardened gears.

One of its main objects is to provide a carborundum disk to dress the emery hobs and other mechanism for truing said carborundum disk by means of diamond cutters.

When the diamond cutters are used directly upon the emery hobs these diamond cutters quickly become used up, making their use in this manner prohibitive.

By using a carborundum disk to dress the hobs and the diamond cutters to true the carborundum disk great economy is effected as there is comparatively little wear of the diamond cutters in keeping the carborundum disk in proper operative condition.

While the disk is preferably made of carborundum it must be understood that other material may be used in said disk provided its hardness is intermediate the hardness of the emery hob and the diamond cutters.

Another object is the provision in a single machine of mechanism adapted to be adjusted to dress emery hobs with threads having various pitches.

These objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 8 represents a transverse vertical section on line 8, 8, on Fig. 6.

Figure 9 represents a vertical section of the speed box, on line 9, 9, on Fig. 1.

Figure 10 represents a horizontal section of same on line 10, 10, on Fig. 9.

Figure 13 represents a plan of the pneumatic feed mechanism.

Figure 14 represents a vertical section of same, on line 14, 14 on Fig. 13.

Figure 15 represents a horizontal section of same on line 15, 15, on Fig. 16.

Figure 16 represents a longitudinal vertical section of same on line 16, 16, on Fig. 13.

Figure 17 represents a transverse vertical section of the mechanism for truing the carborundum disk, the cutting plane being on line 17, 17, on Fig. 6.

Figure 18 represents a plan of the upper end of the truing mechanism.

Figure 19 represents a horizontal section of same on line 19, 19, on Fig. 17.

Figure 20 represents an elevation of the verniers for determining the tilt of the cradle supporting said truing mechanism.

Figure 21 represents an elevation of one end of one of the diamond-supporting reciprocating bars.

Figure 22 represents a perspective of a calipering device used in positioning the diamonds.

Figure 25 represents a sectional detail on line 25, 25, on Fig. 9, and

Similar characters indicate like parts throughout the several figures of the drawings.

Figure 1:
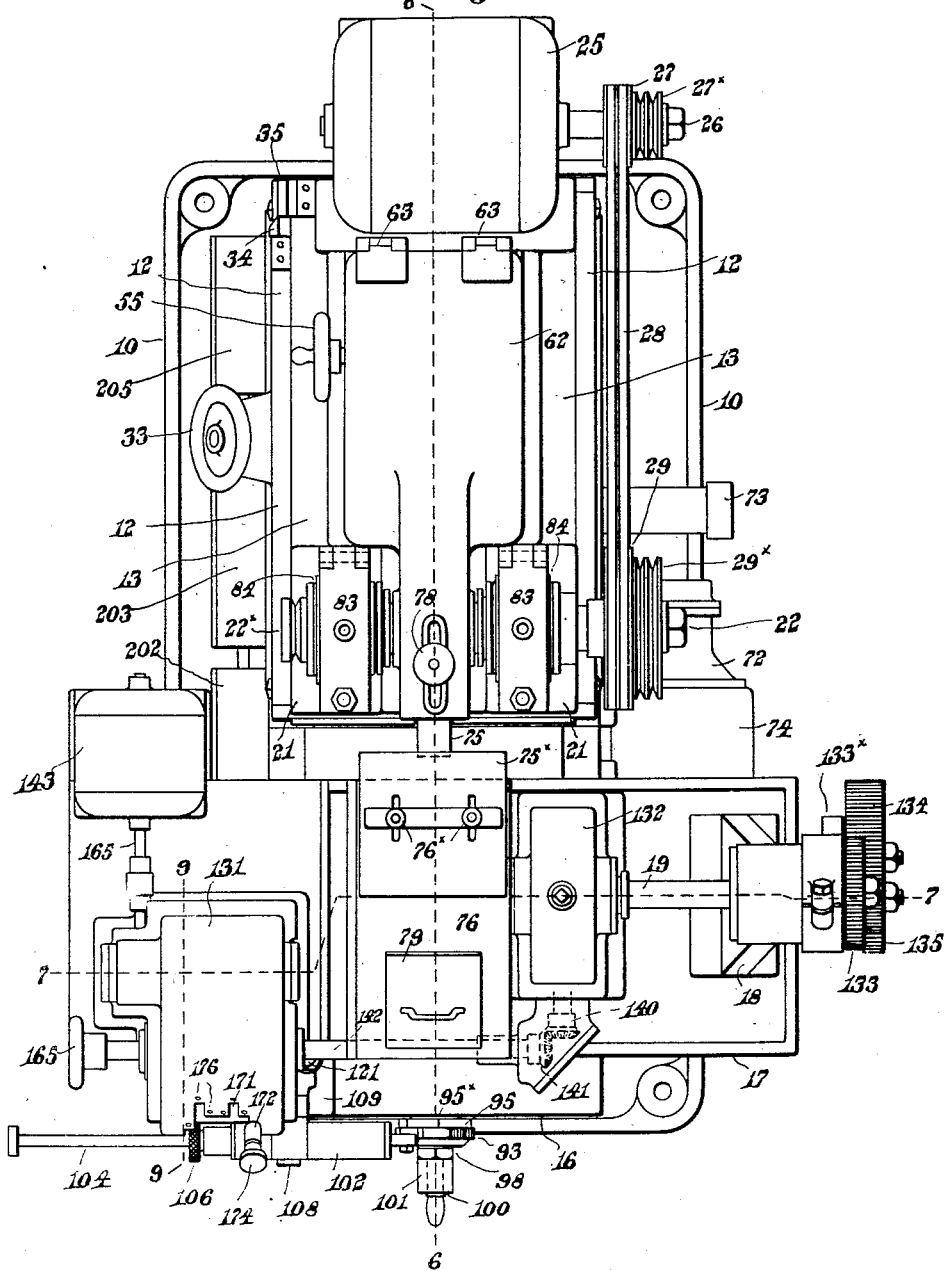
Figure 1 represents a plan of a machine embodying the principles of the present invention.

In the drawings, 10 is a base provided with an upwardly extending frame 11 having secured to its upper end a bed 12 in which is mounted a cradle 13 prevented from moving endwise by the flanges 14 contacting with the opposite ends of said bed.

The frame 11 at its forward end is provided with guides 15 parallel with the sides of the machine.

A support 16 is movable endwise of the guides 15.

Superimposed upon this support 16 is a table 17 movable in a path perpendicular to said guides 15.

Secured to the upper face of the table 17 is a bearing 18 for one end of a revoluble shaft 19 to which the emery hob 20 is secured so as to revolve therewith, the opposite end of said shaft being supported by means hereinafter described.

To the cradle 13 are secured supports 21 enclosing bearing for a revoluble shaft 22 carrying the carborundum disk 23, the periphery of which is shaped to coact with the thread or teeth of the emery hob 20 when dressing the same.

At the rear end of the cradle 13 is a bracket 24 on which is mounted an electric motor 25.

The shaft 26 of this motor 25 has secured thereon a pulley 27 adapted to drive the carborundum disk 23 by means of a belt 28 and pulley 29 secured to the shaft 22.

To the under face of the cradle 13 is secured a worm rack 30, (see Fig. 17) the teeth of which mesh with a worm 31 splined to an inclined shaft 32 mounted to revolve in a bearing formed in the bed 12.

To the outer end of the shaft 32 is secured a hand wheel 33 by which said cradle 13 may be adjusted about its axis.

This axis is in the same plane with the axes of shafts 19 and 22.

The proper degree of adjustment of said cradle may be determined by the verniers 34, 35 secured respectively to the bed 12 and cradle 13, as shown in Figs. 1, 4, 5, and 17.

Bolted to the upper face of the cradle 13 is a member 36 having a guide 37 on its upper face on which a table 38 is adapted to reciprocate.

When the cradle 13 has been adjusted about its axis, it is clamped in adjusted position by the clamp bolts 39 extending through elongated slots 40 in said bed 12 and threaded to said cradle.

Superimposed upon the table 38 are two cylindrical plates 41 and 42, the adjacent faces of which have grooves 43 formed therein.

Each groove 43 is at one side of the center of its cylindrical plates 41 and 42.

The plates 41, 42 have concentric slots 44 formed therein as shown in Figs. 18 and 19 and the upper plate is surmounted by a cap 45.

Bolts 46 extend downwardly through said cap 45 and slots 44 and have their lower ends threaded to the table 38.

When the plates 41, 42 have been adjusted about their centers to vary the angles of the grooves 43 relatively to each other, said plates may be clamped in their adjusted position by means of the clamping bolts 46.

Centrally disposed in the plates 41, 42 is a shaft 47, the lower reduced end of which extends into an anti-friction bearing 48 resting on the table 38.

In each groove 43 is mounted a slidable bar 49 having a rack 50 mounted in a recess in a side face thereof.

The shaft 47 has formed thereon or secured thereto two spur gears 51 each meshing with a rack 50.

To the upper end of the shaft 47 and within a chamber in the cap 45 is secured a worm wheel 52, the teeth of which mesh with a worm 53 keyed to one end of a shaft 54 mounted in a bearing formed in the cap 45.

The outer end of said shaft 54 has a hand wheel 55 secured thereto.

By means of this hand wheel 55 the shaft 47 may be turned first in one direction and then in the opposite direction.

This operation will impart reciprocatory movement to the bars 49 through the gears 51 and racks 50.

When one bar 49 is moving in one direction the other bar will be moving in the opposite direction.

The forward ends of the bars 49 have split ends 56 in which are mounted cylindrical members 57 having diamonds 58 mounted in tapered ends thereof.

The positions of the diamonds 58 relative to the bars 49 are determined by the caliper tool 59, shown in Fig. 22, and when properly set the members 57 are clamped in position by the bolts 60.

The truing mechanism is confined within a housing 61 secured to the cradle 13 and having a closing cover 62 hinged thereto at 63.

The forward end of the cover 62 extends over the carborundum disk 23.

The cradle 13 has a forward grooved extension 13x projecting beneath the carborundum disk 23 and the bottom wall of the groove has an opening 64 therein through which the water and sediment passes into a pan 65 resting on ribs 66 within the frame 11.

The pan has three compartments therein, the first compartment 67 being beneath the opening 64 through which water and sediment is adapted to flow into said compartment 67.

The compartment 67 communicates at the bottom with a second compartment 68 which in turn communicates at the top with a third compartment 69.

Secured to the rear of support 16 is an inclined trough 67x into which will drop the water used during the dressing of the hob and this water and sediment mixed therewith will flow from said trough into the compartment 67.

When it is desired to clean the pan 65 it may be removed through an opening in the rear wall of frame 11, this opening being normally closed by the closure 65x.

The sediment entering the pan 65 will be collected in the compartments 67, 68, while the water free from sediment will pass into compartment 69 and pass therefrom through a screen 70 into a chamber 71 formed in the frame 11.

This chamber 71 communicates with a pump 72 secured to the right side of the frame 11, and is provided with a cleanout opening 73.

The pump 72 is driven by an electric motor 74 secured to the outer face of the frame 11.

Adjustably mounted at the upper end of the cover 62 is an inverted U-shaped plate 75 adapted to straddle the space between the cover 62 and the rear end of the guard 76 in which the emery hob 20 is confined.

The guard 76 has a slidable plate 75x coacting with plate 75 and held in adjusted position by a clamp screw 76x.

The plate 75 is clamped in adjusted position by the clamp nut 78 and when said plates 75, 75x are properly positioned they will prevent water being splashed upwardly during the dressing operation.

Sidesplash boards 20x are also secured to guard 76 on opposite sides of the emery hob 20, these boards being adjustable and adapted to prevent outward splashing of water.

On the front end of the guard 76 is a cover 79 which may be removed to permit the operator to inspect the condition of the hob 20 being dressed.

One side of the guard 76 is provided with a removable cover plate 80 which may be removed when the dressing operation is completed and it is desired to remove the dressed hob 20 from its supporting bearing.

The carborundum disk 23 is clamped to a cylindrical hub 81 by an annular member 82 bolted to said hub and said hub 81 is splined to the shaft 22.

This shaft 22 is mounted in anti-friction bearings 82$x$ resting in the supports 21 which have covers 83 hinged thereto and adapted to be locked to the support 21 and prevent the rotation of the housings 84 of said anti-friction bearings 82$x$.

To one end of the shaft 22 is secured the pulley 29 driven through belt 28 from the motor 25.

The carborundum disk 23 has a formed periphery 85 so shaped as to dress the thread or teeth of the emery hob 20.

Figure 6:
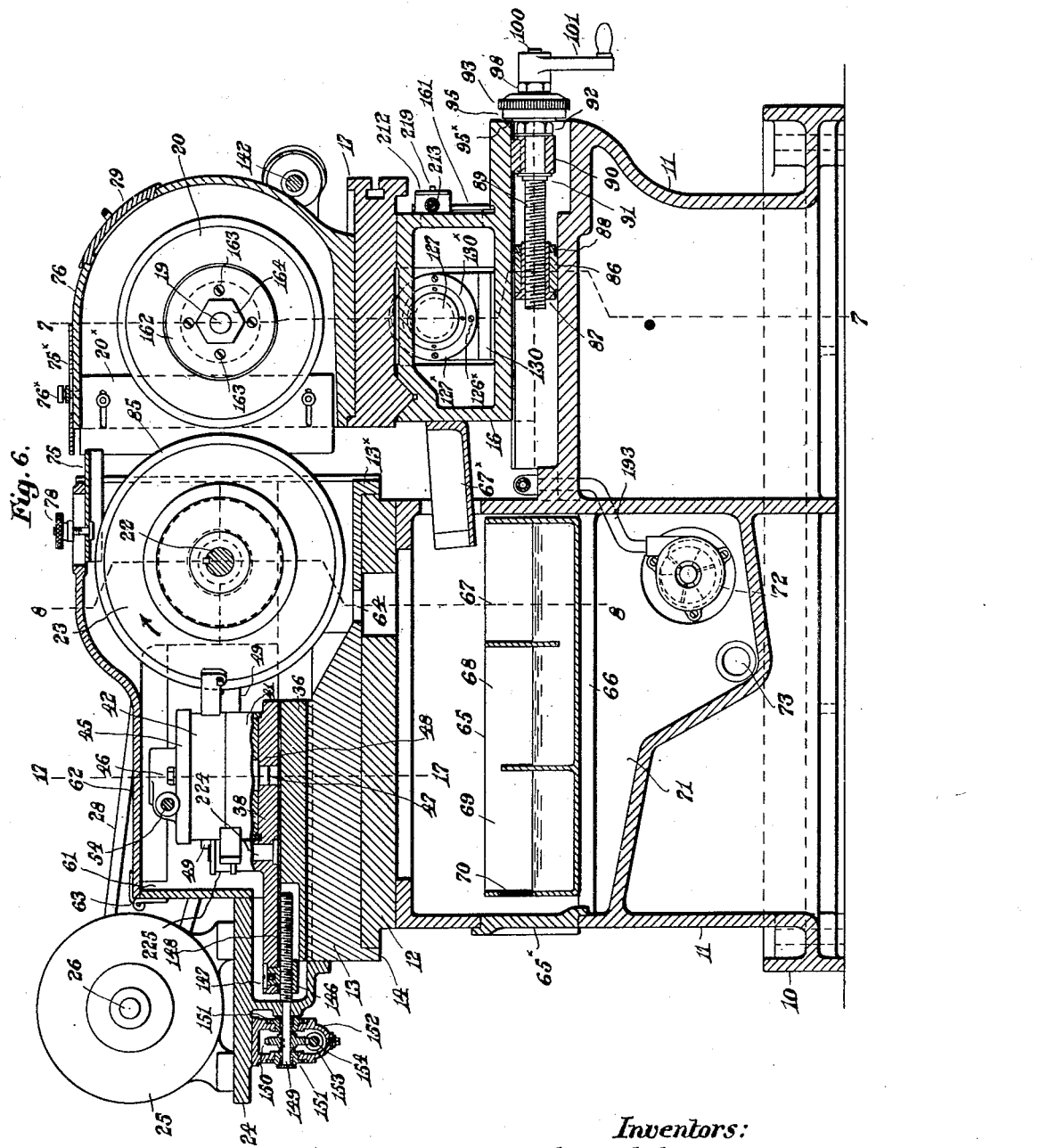
Figure 6 represents a longitudinal vertical section on line 6, 6, on Fig. 1.

Within the frame 11 (see Figs. 6 and 7) and secured thereto is a carrier 86 in which is mounted a flanged nut 87, the flange of which abuts one face of the carrier 86 while a collar 88 threaded to the opposite end of the nut 87 abuts the opposite end of said carrier preventing end movement of the nut.

A feed screw 89 extends through said nut 87.

The screw 89 (see Figs. 6 and 15) rotates in a bearing 90 extending downwardly from the support 16, said screw being prevented from end movement in said bearing 90 by a flange 91 formed on said screw 89 and a collar 92 threaded thereto.

Keyed to the forward end of said feed screw 89 is a ratchet 93 having a rearwardly projecting hub 94 on which is loosely mounted a disk 95 having a radial extension 96 to which is pivoted a pawl 97, one end of which engages the teeth of the ratchet 93.

The disk 95 is retained in position by a collar 95$x$ threaded to hub 94.

The ratchet 93 is retained in position by a nut 98 threaded to the feed screw 89.

The pawl 97 pivoted to the extension 96 normally engages the teeth of the ratchet 93 and at every forward movement of said pawl 97 the feed screw 89 will be rotated about its axis and effect a movement of the support 16 toward the rear of the machine.

The opposite end of the pawl 97 is pivotally connected to a piston rod 99.

The extreme forward end 100 of the feed screw 89 is squared to receive a crank 101 by which said support 16 may be returned to its normal position by rotating the feed screw anti-clockwise.

The piston rod 99 extends through one end of a cylinder 102 and has a piston 99$x$ secured to its inner end.

The cylinder 102 has a bushing 103 therein which limits the movement of the piston in one direction while a centrally positioned rod 104 limits the movement in the opposite direction.

This rod 104 extends through a stuffing box 105 and a split tapered bushing 106 threaded to one end of the cylinder 102.

By moving the bushing 106 outwardly, the rod 104 may be adjusted endwise and then clamped in adjusted position by again moving said bushing inwardly.

A coiled spring 107 within the cylinder normally retains the piston 99$x$ in contact with the inner end of the rod 104.

The cylinder 102 is suspended from a stud 108 secured to a standard 109 secured to the upper face of the support 16 and about the axis of which said cylinder is adapted to rock.

Around this stud 108 is disposed a coil 110 of spring tubing, one end of which communicates with a passage 111, while the opposite end communicates with a passage 112 leading to a chamber 113 surrounding a valve spindle 114.

The spindle 114 has a valve 115 on its lower end normally retained in closed position by a spring 116 in a chamber 117.

A passage 118 leads from this chamber 117 and its opposite end communicates with a pipe 119 leading to a supply of compressed air.

When the valve 115 is opened air under pressure will enter chamber 117, pass into chamber 113, and then through passages 111, 112 and coiled tube 110 into one end of the cylinder 102 and force the piston 99$x$ toward the opposite end of said cylinder, thus effecting a movement of the ratchet 93 and partial rotation of the feed screw 89.

The upper end of valve spindle 114 has a passage 120 therethrough and surmounting this spindle is a headed plunger 121 extending upwardly through a bushing 122 with its upper end in the path of cam members 123, 123$x$ mounted on the table 17 and adjustable endwise thereof.

When the valve 115 is closed no more compressed air can enter the cylinder and the spring 107 will move the piston to its original position, the air in the cylinder 102 escaping through passages 111, 112 and 120 and around the plunger 121 which is a loose fit in its chamber.

The closing cap 124 at one end of cylinder 102 is provided with a vent 125 through which air may escape from said cylinder when the piston 99$x$ is moving toward the ratchet 93.

The support 16 at its rear end has an upward extension 16$x$ which is provided with a chamber 126 through which extends a lead screw 127.

The upper face of extension 16$x$ has a guide way 128 extending lengthwise thereof to receive a downwardly projecting guide 129 formed on the under side of the table 17.

Within the chamber 126 and secured to an upper face of support 16 is a casing 130 containing two nuts 130$x$, the teeth of which mesh with the thread of lead screw 127.

One of these two nuts 130$x$ may be adjusted relatively to the other to take up wear and obviate backlash and then locked in adjusted position by the collar 127$x$ secured to casing 130 by screws 126$x$.

In the front of the support 16$x$ is an opening normally closed by a plate 161 which may be removed when it is desired to adjust the movable nut 130$x$ by means of a spanner wrench in the depressions 128$x$.

When this movable nut 130$x$ is adjusted properly the screws 126$x$ are turned to retain the nut in adjusted position.

The other nut 130$x$ is fixedly secured to the casing 130 by screws 129$x$.

Figure 7:
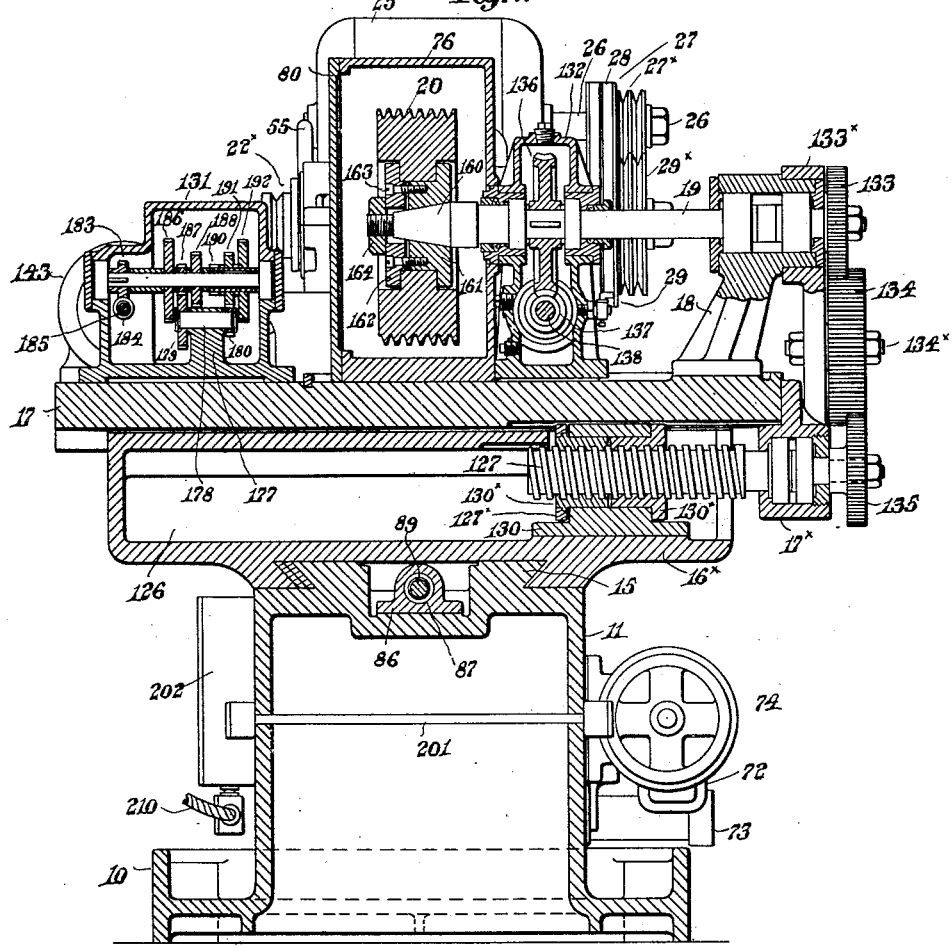
Figure 7 represents a transverse vertical section on line 7, 7, on Fig. 1.
Figure 23:
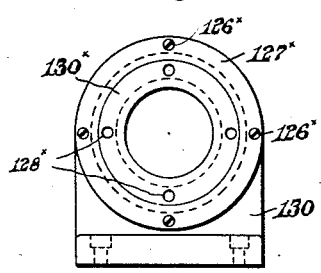
Figure 23 represents an elevation of the rear end of the support for the nuts coacting with the lead screw.
Figure 24:
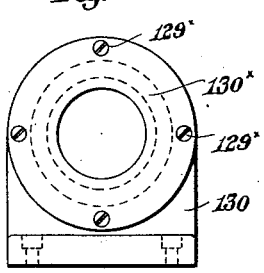
Figure 24 represents an elevation of the front end of said support.
Figure 11:
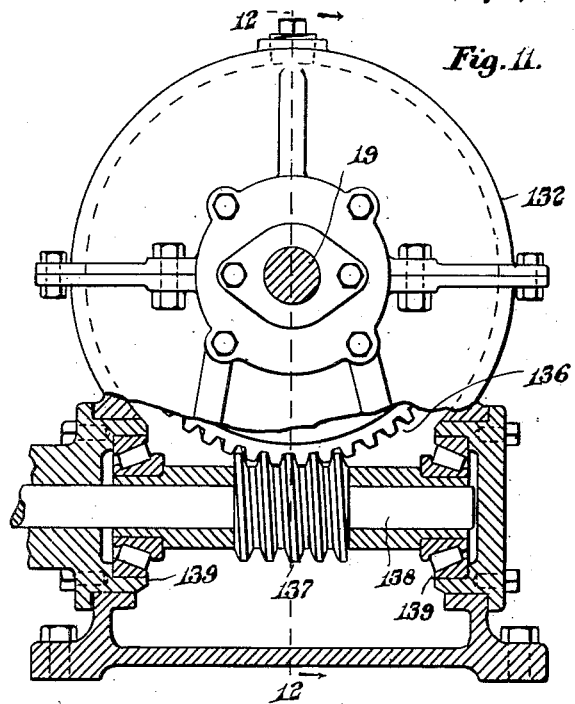
Figure 11 represents an elevation of the gear casing, partially in section.
Figure 12:
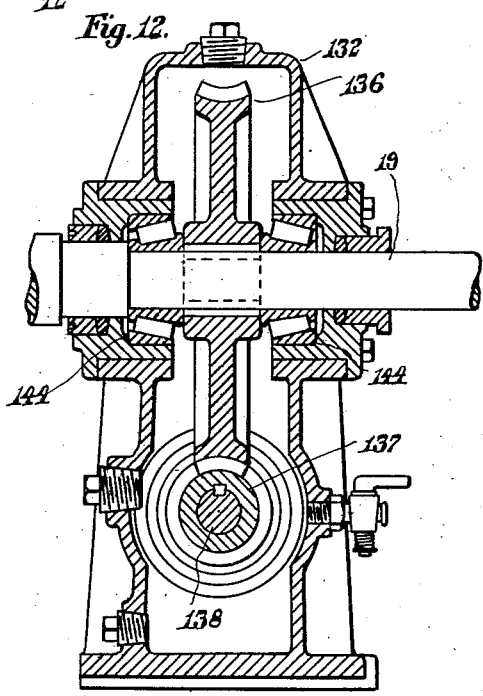
Figure 12 represents a vertical section of same on line 12, 12 on Fig. 11.

This construction is best shown in Figs. 7, 23 and 24.

Whenever this lead screw 127 is rotated it will move endwise and impart end movement to said table 17 and all the parts mounted thereon, the lead screw 127 rotating in a bearing in a bracket 17$x$ secured to and depending from the table 17.

The lead screw has no end movement relative to said bearing.

Secured to the upper face of table 17 are the speed box 131, the gear casing 132, and the supporting bracket 18 for the shaft 19.

Secured to the outer end of the shaft 19 is a gear 133 meshing with an intermediate gear 134 which in turn meshes with a gear 135 secured to the outer end of the lead screw 127.

The intermediate gear 134 rotates about a stud 134x adjustably mounted in a slotted arm 133x depending from and clamped to the bracket 18.

This construction provides a means whereby various sizes of intermediate gears 134 may be used, thus varying the relative speeds of shaft 19 and lead screw 127.

The shaft 19 has secured thereto within the gear casing 132, a worm gear 136 which is driven by a worm 137 on shaft 138 mounted in bearings 139 in the walls of said casing.

The forward end of the shaft 138 has a bevel gear 140 secured thereto meshing with another bevel gear 141 on a shaft 142 extending to a speed changing mechanism in the speed box 131, said speed changing mechanism being driven by means of the electric motor 143.

The shaft 19 revolves in anti-friction bearings 144 and the entire lower part of said casing is adapted to be filled with a lubricant in which said gear 136 and worm 137 may rotate.

To the rear end of the table 38 carrying the truing device is secured a nut 146 by means of a headed screw 147.

Disposed in this nut 146 is a revoluble screw 148 having a reduced end 149 to which is secured a worm gear 150 positioned between anti-friction bearings 151 in a casing 152 depending from the bracket 24.

The bearings 151 prevent end movement of the screw 148 while permitting free rotating thereof.

The worm gear 150 meshes with a worm 153 secured to a shaft 154 mounted in anti-friction bearings in the casing 152.

This shaft 154 extends through a tubular projection 155 projecting from the casing 152 and has secured to its outer end a hand wheel 156.

When the hand wheel is turned the screw 148 will be rotated in the nut 146 and impart end movement to the table 38, the nut moving into a depression formed therefor in the upper face of the member 36 secured to upper face of cradle 13.

The shaft 154 extends through the fixed barrel or projection 155 having at its outer end a cone-shaped head 158 provided with a suitable scale.

Between this head 158 and hand wheel 156 the shaft 154 has secured thereto a vernier disk 159 which is fixedly secured to the shaft 154 and coacts with the head 158 to determine the desired adjustment of said table 38.

The inner end of the shaft 19 has an enlarged cone shaped head 160 on which is mounted an annular flanged disk 161 having a reduced portion inserted into a recess in one face of the emery hob 20 which has in its opposite face another recess in which is disposed another annular clamping member 162, the two annular members being bolted together by bolts 163.

The disk 161 is forced onto the cone shaped head 160 by means of nut 164 and is retained thereby on said head 160.

The emery hob 20 is preferably about fourteen inches in diameter and may be anywhere from two inches to four and a half inches in thickness, according to the work to be done thereby.

When, for any reason, it is desired to turn the emery-hob shaft 19 by hand, this may be accomplished by means of the hand wheel 165.

Within the speed box 131, the shaft 142 has splined thereto a gear 166, and movable about this shaft 142 is a member 167 which straddles the gear 166 and is movable with said gear lengthwise of the shaft 142 within the limits of said box 131.

The member 167 also straddles another gear 168 mounted on a stud 169 in the upper end of said member 167 and is freely revoluble about the axis thereof, said gear 168 being in mesh with the gear 166 at all times.

The member 167 has an arm 170 extending through an opening 171 in the top of the speed box 131, this arm 170 having at its outer end a socket 172 in which is mounted a spring pressed bolt 173 provided with a head 174 by which said bolt 173 may be moved outwardly against the tension of the spring 175.

This spring 175 bearing against a shoulder on the bolt 173 normally retains the outer end of said bolt in one of the depressions 176 and locks the member 167 in its adjusted position on the shaft 142.

Within the speed box 131 is a support 177 for a short shaft 178 having secured to its opposite ends the gears 179, 180, of different diameters.

Above the shaft 178 is another shaft 181 freely revoluble in anti-friction bearings 182 in the opposite side walls of box 131.

The shaft 181 has a worm wheel 183 secured thereto which meshes with a worm 184 on the shaft 185 of the motor 143.

Rotary movement is imparted by this means to the shaft 181 from motor 143.

Secured to the shaft 181 are spur gears 186, 187 and 188 of different diameters, the smaller gear 187 being always in mesh with the gear 179 on shaft 178.

Loosely mounted on the shaft 181 is a sleeve 189 having keyed thereto the spur gears 190, 191 and 192 of different diameters, the intermediate gear 191 being in mesh with the small gear 180 on shaft 178.

When the shaft 181 is rotated the gears 186, 187, and 188, will be driven directly from said shaft 181 while the gears 190, 191, 192, will be driven in the same direction through the intermediate gears 179, 180 but at a different speed.

By moving the member 167 along the shaft 142 and about the axis of said shaft, the gear 168 may be brought into mesh with either of the gears 186, 187, 188, 190, 191 and 192 and thus obtain six variations in speed for the shaft 142 which through intermediate mechanism rotates the emery hob 20.

The pump casing 72 is secured to a plate 72x fastened to a wall of the framework 11 and is disposed within the receptacle 71 with which the inlet of said pump communicates.

The pump outlet has a pipe 193 leading therefrom through which liquid may be forced from the receptacle 71 to be used on the carborundum disk 23 and emery hob 20 during the dressing operation or to the carborundum disk 23 when the latter is being trued.

This pipe 193 communicates with a three way valve 194 from one branch of which a flexible pipe 195 leads to the nozzle 195x from which liquid is discharged onto the peripheries of the disk 23 and hob 20 where they are in contact.

A flexible pipe 196 leads from the other branch of the valve 194 to an upwardly extending nozzle 196x which discharges liquid upwardly onto the periphery of the disk 23 at a point where the diamonds 58 contact therewith.

By means of valve 194 the liquid from pump may be diverted to either nozzle 195 or 196x as desired.

The pump shaft 197 (see Fig. 5) has a spiral gear 198 meshing with another spiral gear 199 on the shaft 200 of motor 74.

Figure 4:
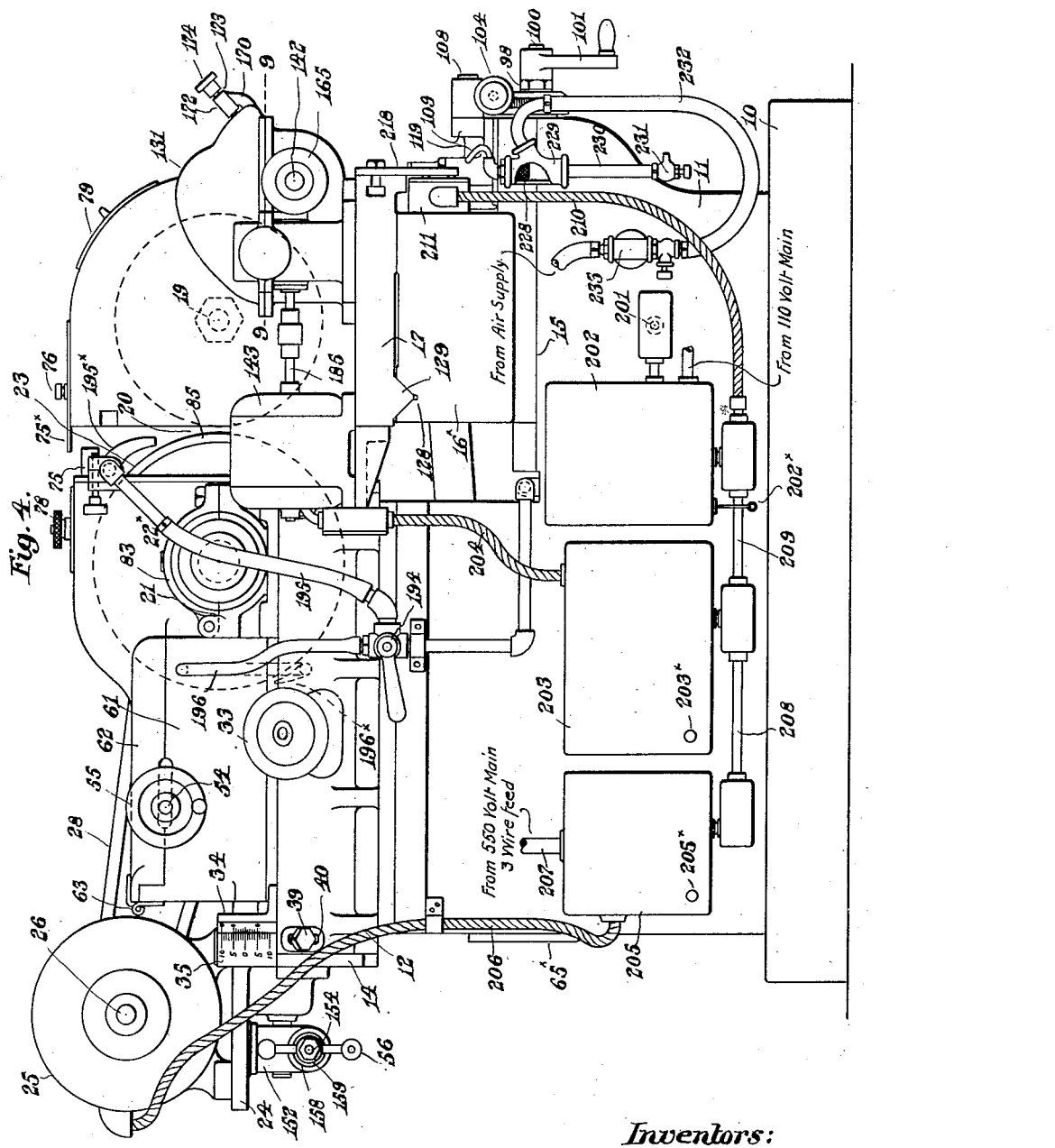
Figure 4 represents an elevation of its left side.
Figure 5:
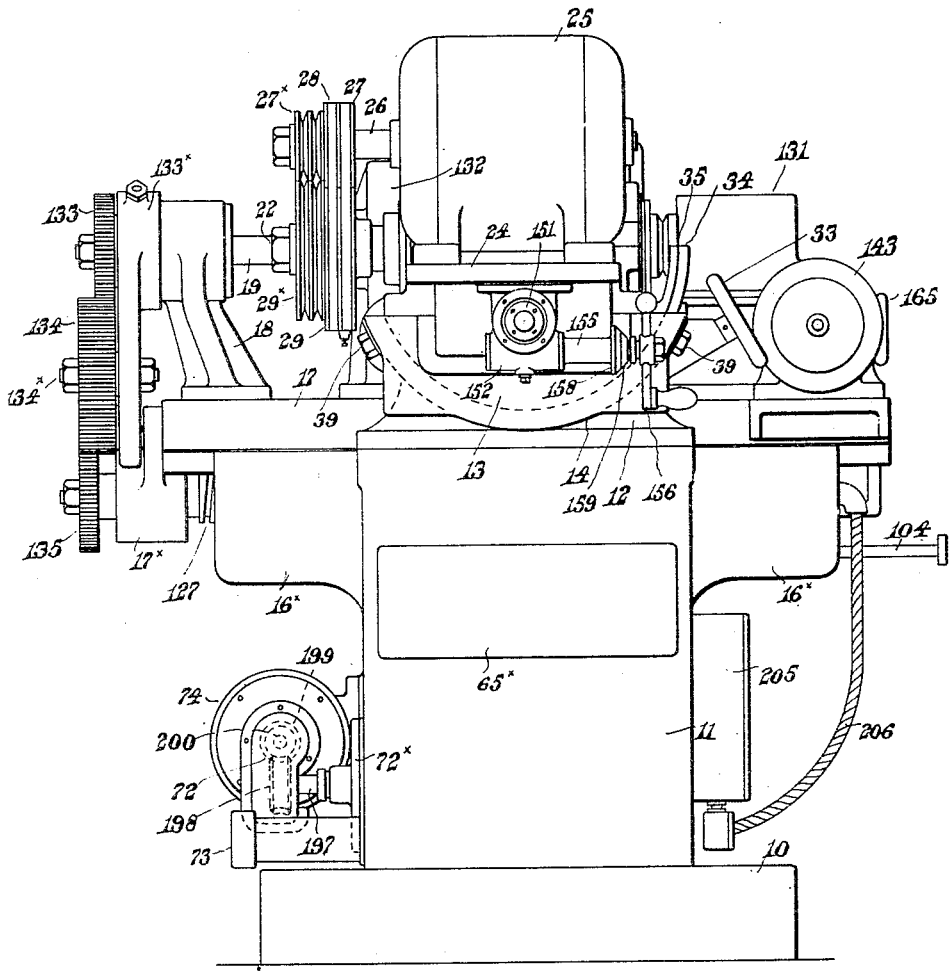
Figure 5 represents a rear elevation of said machine.

The motor 74 is connected by a cable 201 by a relay panel 202 on the left side of the machine as shown in Fig. 4.

A reversible magnetic switch box 203 is also mounted on the left side of the machine, which box is electrically connected by cable 204 to the reversible motor 143.

A similar magnetic switch box 205 is also mounted on the left side of the machine and this box 205 is connected electrically by cable 206 with the motor 25 for driving the carborundum disk 23.

The disk 23 may be driven at a different speed by placing shorter belts 28 on the reduced portions $27x$, $29x$, of the pulleys 27, 29.

A cable 207 from switch box 205 extends to a source of electric supply.

The switch boxes 205 and 203 are connected by cable 208 and switch box 203 is connected to the relay panel 202 by cable 209.

The relay panel 202 is connected by cable 210 to the switch box 211 on the front of machine.

As the switch boxes 203 and 205, the relay panel 202 and the switch box 211 are of usual construction, it is deemed unnecessary to illustrate the same in detail.

Figure 26:
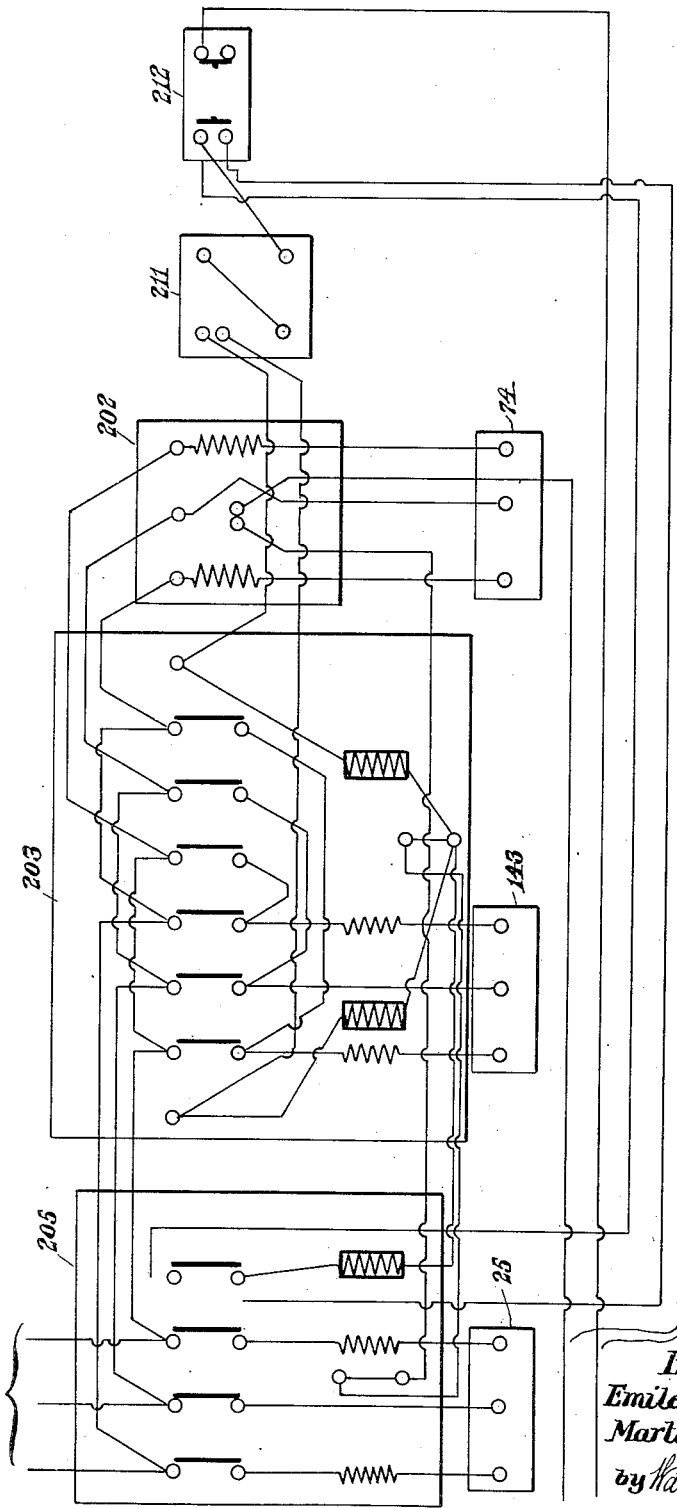
Figure 26 represents a diagram of the electric wiring for said machine.

These switch boxes 203, 205, and relay panel 202, contain mechanism as shown in diagram in Fig. 26 which will stop the operation of all motors should either of the motors be overloaded.

On the front of the machine is an electric starting and stopping device 212 of usual construction and this device is electrically connected by cable 213 to a three way reversible switch 211 having outwardly extending switch arms 214, 215.

The upper switch arm 214 is in the path of the fingers 216, 217, adjustably secured to the front of the table 17 and the lower arm 215 is in the path of another emergency finger 218 also adjustably mounted on the front of the table 17.

The device 212 is provided with two buttons 219, 220, and by pressing on the button 220, electric connection is made with the corborundum-disk motor 25 and the pump motor 74 and these motors will continue to operate until the switch button 219 is actuated to stop these motors 25, 74.

Figure 2:
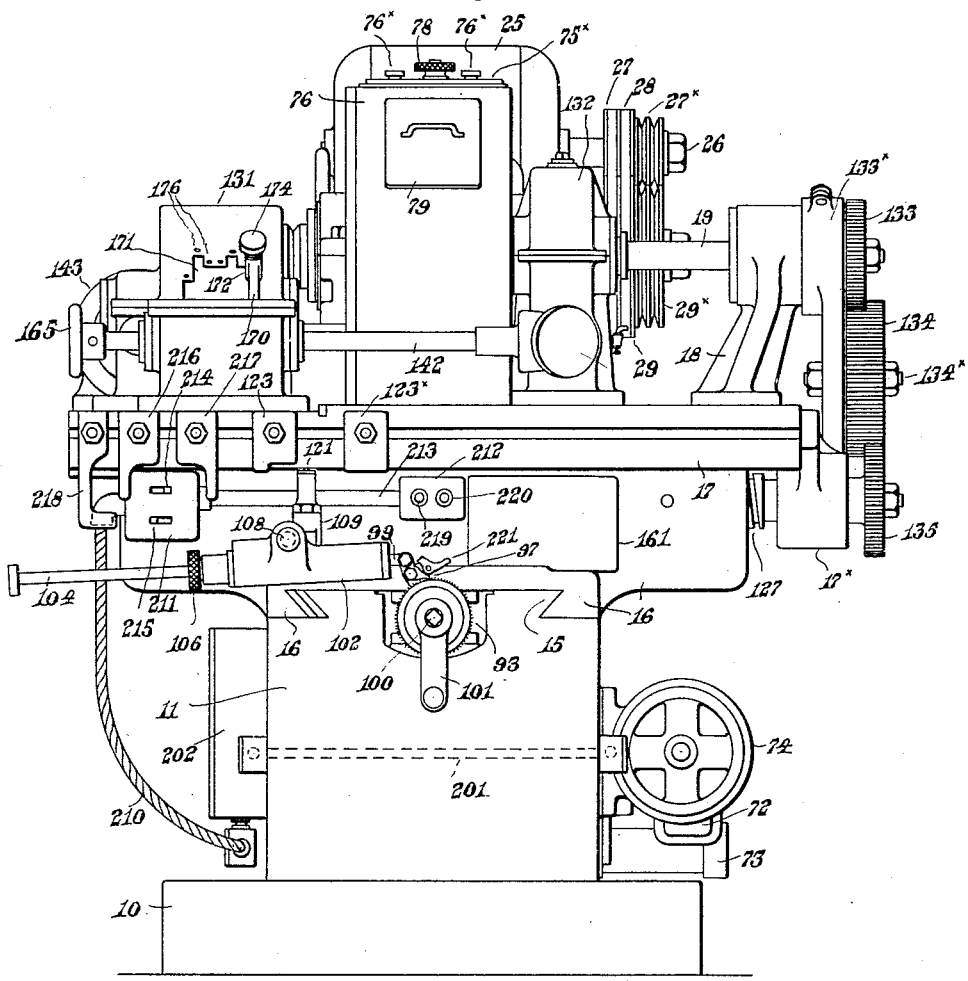
Figure 2 represents a front elevation of the same.
Figure 3:
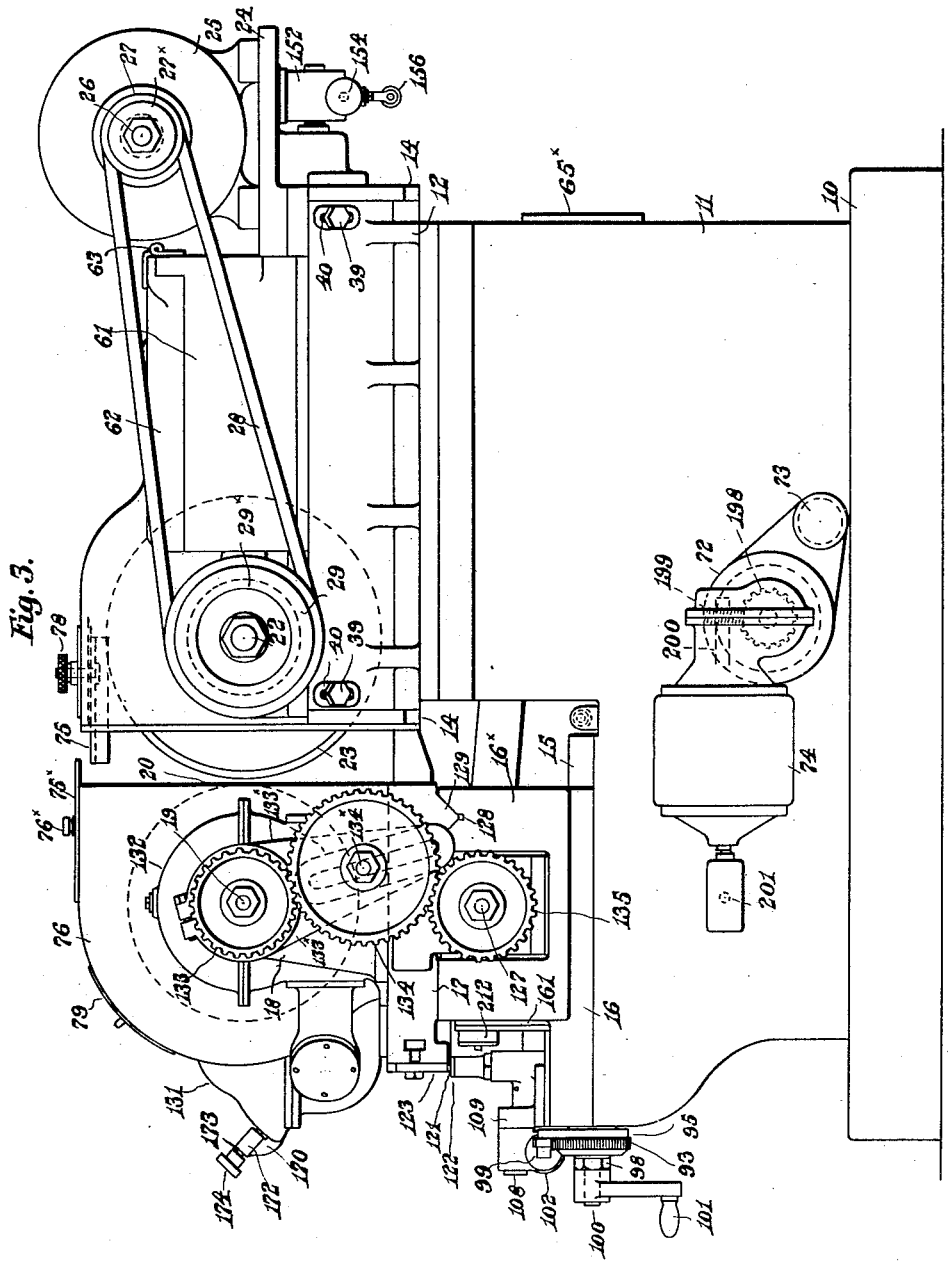
Figure 3 represents an elevation of the right side of the machine.

To start the table 17 the switch arm 215 is moved to the left of Fig. 2, which will place motor 143 in operation and move the table 17 to the left of said Fig. 2.

This motor 143 is a reversible motor of usual construction and will be reversed as soon as the finger 217 contacts with switch arm 214 and moves it to the left thereby causing the table 17 to be moved in the opposite direction.

When the finger 216 comes into contact with switch arm 214 and moves it to the right, the direction of movement of table 17 will again be changed.

By this means a continuous reciprocation of the table 17 will be provided for automatically.

The fingers 216, 217 will be adjusted on the table 17 according to the width of the emery hob 20 being dressed, it being understood that various widths of hobs may be dressed on this machine.

Also adjustably mounted on the table 17 are the cam members 123, $123x$, which in the movement of said table 17 alternately contact with plunger 121 to depress the same and release the air from the cylinder 102.

These cam members 123, $123x$ are so adjusted on the table 17 that they will depress the plunger 121 just before the fingers 216, 217 contact with arm 214 of the switch box 211.

The table 17 is thus reciprocated continuously by automatically controlled mechanism until the button 219 is pressed inwardly to stop the machine.

Pivoted to the extension 96 at $96x$ is a pawl locking device 221, one arm of which is provided with a V-shaped projection 222 adapted to engage a V-shaped notch 223 in the pawl 97 and prevent its engagement with ratchet 93 when desired.

As soon as the projection 222 is moved from the notch 223 the next forward movement of piston rod 99 will cause the pawl 97 to engage the teeth of ratchet 93.

The locking device 221 is frictionally held in any position and it may be moved about its pivot $96x$.

The magnetic switches 205, 203 are provided with resetting buttons $205x$ and $203x$ for resetting the switches when they have been opened for any reason.

The relay panel 202 is also provided with a resetting wire $202x$ for resetting the mechanism contained therein.

The table 38 has an upwardly extending stud 224 adapted to receive a gauge 225 interposed between the projecting ends of the reciprocating bars 49 to set them to the proper angles.

After the bars 49 have been properly set the gauge 225 is removed from stud 224 and is only replaced thereon when another setting of said bars is required.

On the outer end of the shaft 22 is keyed a split bushing 26 having a cone-shaped periphery fitted to a recess in the hub of pulley 29 and threaded to said shaft 22 is a nut 227 adapted to force the pulley 29 onto said split bushing, thereby increasing the frictional contact between said pulley and bushing and between said bushing and shaft.

The air entering the pipe 119 (see Fig. 4) first passes through a strainer 228 in a housing 229 having depending therefrom a pipe 230 provided at the bottom with a discharge cock 231.

Below the strainer 228 the housing 229 is connected with a pipe 232 having a valve 233 therein and leading from the source of compressed air.

When the valve 233 is open compressed air will pass through the pipe 232 and housing 229 to the pipe 119.

The air will pass freely through the strainer 228 while all sediment will drop into the pipe 230 and collect therein.

When it is desired to remove the sediment from pipe 230 the valve 231 will be opened and the compressed air entering housing 229 will force all sediment from said pipe through discharge cock 231.

Should the arm 214 become broken off thus preventing the continuous reciprocation of table 17, the finger 218, in the movement of table 17 to the right of Fig. 2, will contact with arm 215 and move it to right and in so doing stop the machine.

In the operation of the machine, the members 123, $123x$, 217 and 216 are adjusted along the table 17 and clamped in adjusted positions according to the width of the emery hob 20 to be dressed.

When the hob 20 has been mounted on the head 160 of shaft 19, the operator presses the starting button 220 and the motors 25, 74, will be placed in operation causing the abrasive disk 23 to be rotated and the pump 72 to be operated to pump liquid onto said disk.

The pressing of button 220 will also permit the electric current to pass to switch 211.

The pawl 97 is removed from ratchet 93 and held in removed position by the locking lever 221.

The operator then by means of handle 101 rotates the feed screw 89 to move the support 16 to the rear with the emery hob 20 in position to be operated upon.

The locking lever 221 is then released from the pawl 97 permitting the pawl to engage with the teeth of the ratchet 93.

The switch arm 214 is then moved to left of Fig. 2 and the table 17 will commence to reciprocate in the manner hereinbefore described and as the valve 233 has previously been opened compressed air will be admitted to cylinder 102 and cause the pawl 97 to impart a step by step movement to said ratchet 93.

This operation will gradually advance the emery hob 20 in contact with the disk 23 allowing the latter to dress the teeth or thread of said hob.

When it is desired to true the formed periphery of the disk 23, the feed screw 89 is rotated by hand contra-clockwise and the hob 20 is moved toward the front of machine and from contact with the disk 23.

The truing device having been properly set for the particular work to be performed, it is moved toward the disk 23 by wheel 156 and then the diamond-supporting bars are reciprocable by wheel 55.

When the disk 23 has been trued the truing device is returned to its normal position.

When it is desired to remove the disk 23, the cover 62 is raised about the hinges 63, the bearing caps 83 are raised about their hinges and then the shaft 22 is lifted from its bearings by means of ropes passed about the pulley 29 and grooved head 22x of shaft 22.

When the hob has been properly dressed the end plate 80 is removed from the hood 76, the nut 164 removed, and then the hob 20 with its clamping plates 161, 162 may be removed from head 160 and placed upon a rack ready for use in another machine for grinding gears.

The lead screw 127 is always driven from the shaft 19 and when it is desired to vary the relative speeds of the shaft 19 and screw 127, this may be accomplished by substituting another intermediate gear 134 of different diameter.

The speed of rotation of both shaft 19 and screw 127 may be varied by the speed changing mechanism in the speed box 131.

Should either of the electric motors become overloaded, the magnetic switches 203, 205 will act to stop the operation of the entire machine.

After any work is completed, the machine may be stopped by pressing on button 219 which will cut off the current from all the motors.

It is believed that the operation and many advantages of the invention will be understood readily without further description.

Having thus described our invention, we claim:

1. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a cylinder in which said piston is positioned; and means for admitting compressed air to said cylinder behind said piston.

2. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a cylinder in which said piston is positioned; means for admitting compressed air to said cylinder behind said piston, and means for regulating the stroke of said piston.

3. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a cylinder in which said piston is positioned; means for admitting compressed air to said cylinder behind piston; and means for regulating the admission of said compressed air.

4. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a cylinder in which said piston is positioned; means for admitting compressed air to said cylinder behind said piston; and means carried by said table for regulating the admission of said compressed air.

5. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a cylinder in which said piston is positioned; means for admitting compressed air to said cylinder behind said piston; a valve mechanism for controlling the admission of compressed air including an upwardly extending plunger; and lugs adjustably mounted on said table to actuate said valve mechanism.

6. In a machine of the class described provided with stationary bearings for a revoluble shaft to which is secured a disk of abrasive material having a formed periphery; a supporting table on which is mounted a revoluble grinding hob adapted to be operated upon by said disk; means for moving said table in a path parallel with said shaft; a support for said table; a screw for moving said support to position said hob in contact with said disk; a ratchet on said screw; a pawl engaging said ratchet; a plunger for actuating said pawl; a piston on said plunger; a fixed block secured to said support; a cylinder pivoted to said block in which said piston is positioned; a valve mechanism in said block including an upwardly extending plunger; lugs adjustably mounted on said table to actuate said valve mechanism; and a coil of spring tubing about the cylinder pivot connecting the air passages in said block and cylinder.

7. In a machine of the class described provided with stationary bearings for a revoluble shaft to which is secured a disk of abrasive material having a formed periphery; a supporting shaft on which is mounted a revoluble grinding hob adapted to be operated upon by said disk; a table carrying said shaft; means for reciprocating said table in a path parallel with said shaft; a support for said table; mechanism for moving said support to position said hob in contact with said disk; a casing in which said hob rotates; and a removable plate on said casing opposite the end of said shaft.

8. In a machine of the class described provided with stationary bearings for a revoluble shaft to which is secured a disk of abrasive material having a formed periphery; a shaft carrying a grinding hob adapted to be operated upon by said disk; a table carrying said shaft; means for reciprocating said table in a path parallel with said shaft; a support for said table; mechanism for moving said support to position said hob in contact with said disk; a cone-shaped head at the inner end of said shaft; an annular plate mounted on said head; and a ring bolted to said plate and clamping said hob to said plate.

9. In a machine of the class described provided with stationary bearings for a revoluble shaft to which is secured a disk of abrasive material having a formed periphery; a table having a revoluble grinding hob mounted thereon adapted to be operated upon by said disk; a revoluble screw for moving said table in a path parallel with said shaft; a support for said table; mechanism for moving said support to position said hob in contact with said disk; a shaft for said hob revoluble in bearings mounted on said table; a worm gear on said hob shaft; a driving worm therefor; and intermeshing gears on the outer ends of the hob shaft and screw.

10. In a machine of the class described provided with a revoluble abrasive disk; a reciprocating table supporting a revoluble emery hob adapted to be operated upon by said disk; means for moving said hob towards said disk; a truing device; means for moving said truing device into position to act on said disk; means for discharging liquid onto the periphery of said disk during the dressing of the hob or the truing of the disk; a sediment collecting pan beneath said disk; means for collecting the used liquid in one end of said pan and discharging it from the other end; and a screen in the outlet of said pan.

11. In a machine of the class described, a revoluble abrasive disk; a shaft therefor; an electric motor for rotating said shaft; a shaft on which is mounted an emery hob; mechanism for rotating the emery hob shaft including an electric motor; a pump for pumping liquid onto said disk and hob during the hob dressing operation; an electric motor for driving said pump; and means for automatically stopping the operation of said machine when either electric motor is overloaded.

12. In a machine of the kind described, a work support, a tool for operating on work carried by the support, and means for feeding the support across the tool including a feed screw, a pawl and ratchet mechanism actuating said feed screw having a pawl swingingly oscillatable about the axis of the screw, and a pneumatic mechanism for effecting said oscillation of the pawl and including a cylinder, a piston reciprocable in the cylinder and connected to the oscillatable ratchet device, and means to control admission of pressure fluid to the cylinder.

13. In a machine of the kind described, a work support, a tool for operating on work carried by the support, and means for feeding the support across the tool including a feed screw, a pawl and ratchet mechanism actuating said feed screw having a pawl swingingly oscillatable about the axis of the screw, and a pnuematic mechanism for effecting said oscillation of the pawl and including a cylinder, a piston reciprocable in the cylinder and connected to the oscillatable ratchet device, means to control admission of pressure fluid to the cylinder, and means for regulating the stroke of the piston.

14. In a machine of the kind described, a work support, a tool for operating on work carried by the support, and means for feeding the support across the tool including a feed screw, a pawl and ratchet mechanism actuating said feed screw having a pawl swingingly oscillatable about the axis of the screw, and a pneumatic mechanism for effecting said oscillation of the pawl and including a cylinder, a piston reciprocable in the cylinder and connected to the oscillatable ratchet device, a valve controlling the admission of air to the cylinder and having an operating means, lugs adjustably mounted on said table and movable with the table to engage the valve operating means and open the valve, and means to secure said lugs in adjusted positions.

15. In a machine of the kind described, a work support, a tool for operating on work carried by the support, and means for feeding the support across the tool including a feed screw, a pawl and ratchet mechanism actuating said feed screw having a pawl swingingly oscillatable about the axis of the screw, and a pneumatic mechanism for effecting said oscillation of the pawl and including a cylinder, a piston reciprocable in the cylinder and connected to the oscillatable ratchet device, a valve controlling the admission of air to the cylinder and having an operating means, lugs adjustably mounted on said table and movable with the table to engage the valve operating means and open the valve, means to secure said lugs in adjusted positions, said valve when normally closed permitting escape of fluid from the cylinder, and spring means urging the piston to normal position in the cylinder.

16. In a machine of the class described, a work carrying table mounted for sliding movement, a tool support toward and from which said table moves, a shaft supported from said table to move therewith and arranged to support a work piece for movement into and out of contact with the tool, a casing carried by the table and enclosing the work piece except on the side next the tool holder and an extension piece mounted on the upper part of said casing and movable toward and from the tool holder independently of said casing.

17. In a machine of the class described, a work carrying table mounted for sliding movement, a tool support toward and from which said table moves, a shaft supported from said table to move therewith and arranged to support a work piece for movement into and out of contact with the tool, a casing carried by the table and enclosing the work piece except on the side next the tool holder, and a second casing enclosing the tool holder except on the side next the tool, the edges of the open ends of said casings being arranged to lie in proximal relation with the upper part of one casing overlapping the upper part of the other casing.

18. In a machine of the class described, a work carrying table mounted for sliding movement, a tool support toward and from which said table moves, a shaft supported from said table to move therewith and arranged to support a work piece for movement into and out of contact with the tool, a casing carried by the table and enclosing the work piece except on the side next the tool holder, a second casing enclosing the tool holder except on the side next the tool, the edges of the open ends of said casings being arranged to lie in proximal relation, and means mounted on one of the casings at its open end and movable toward the other casing whereby at least partially to close the gap between said casings.

19. In a grinding machine, a rotary grinding wheel, a rotary work holder, a pump for supplying liquid to the wheel, individual motor drives for the wheel, work holder and pump, and means for automatically stopping all of said motors when either is overloaded.

20. In a machine of the class described, an abrasive wheel, a work support adapted to support work in contact with the wheel, means for discharging liquid onto said wheel during rotation thereof, a sedimentation pan, means for collecting used liquid from the wheel and delivering it to the sedimentation pan at one end of the pan, said pan having an outlet at its other end, and a screen in said outlet.

EMILE E. TOUGAS.
MARTIN T. SCHUMB.